Patented June 6, 1933

1,912,746

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

SEPARATION OF CELLULOSE ACETATE FROM ITS REACTION BATH

No Drawing.   Application filed December 14, 1929.   Serial No. 414,238.

This invention relates to a method of separating cellulose acetate, hydrolyzed or unhydrolyzed, from its reaction mixture which comprises the precipitation of the cellulose acetate from the mixture in the presence of carbon dioxide.

Cellulose acetate is generally manufactured in two stages,—in the "first stage" the cellulose being esterified to a cellulose triacetate and in the "second stage" the cellulose triacetate being hydrolyzed or deacetylated to a solubility in the solvent from which the ester is to be coated into film or other commercial products. In some instances the cellulose triacetate may be separated from the esterifying "first stage" bath and used without the treatment given in the "second stage". It is usual, however, to carry the cellulose acetate through the first and second stages prior to separating the ester from the ingredients of esterification.

Whether the ester be prepared only by the "first stage" esterification or by both stages it is generally necessary to precipitate the ester therefrom and thoroughly wash and purify it from the reaction materials before the cellulose acetate is fitted for use. This is often done by precipitating the ester in a coagulating medium such as water or other non-solvents of the cellulose acetate. As would be expected, by plunging a first or second stage esterifying mixture into water which is a usual procedure, the cellulose acetate is precipitated in a more or less solid form, and due to this solidity it is difficult, and, in some instances in which the precipitation has been carelessly effected, impossible to thoroughly wash from the cellulose acetate the reaction products occluded in the precipitated mass.

Various expedients have been worked out for precipitating the ester in a form that will enable the washing and purification of the precipitated cellulose acetate to be more readily and efficiently carried out. None of these expedients, however, have proven entirely satisfactory owing to increased cost in operation or difficulty in removing from the ester the ingredients used to effect a more thorough and more highly comminuted cellulose acetate precipitate. The importance of this washing will be readily understood when it is realized that a thorough and complete washing of the acetate requires periods up to as much as one week for batches of commercial proportions, thus tying up much material in process and thereby increasing inventory and the cost of the finished material.

An object of the present invention is to provide a process for the precipitation of cellulose acetate in such form that it is readily separated from contaminating ingredients. A further object of this invention is to provide a process for the precipitation of cellulose acetate in a porous, tubular form. Other objects will hereinafter appear.

We have found that by saturating the esterifying bath, prior to precipitation, with carbon dioxide and then precipitating the resulting bath in warm water or other suitable coagulating bath a cellulose acetate in a finely divided and readily washed form will result. This saturation of the bath may be effected either in the "first stage" or the "second stage" or in any other step of the acetylation in which the cellulose acetate in solution is to be separated from that solution.

There are various methods by which these baths may be saturated with the carbonic acid gas. For example, the gas may be injected into the bath from a charged cylinder of the gas and thereby, from the pressure in the tank as well as the absorption of the gas by the solution, imparting to the precipitated cellulose acetate the preferred form. This may likewise be effected by adding a water soluble carbonate or a carbonate which is soluble in the coagulating bath, such as alkali carbonates, and particularly sodium bicarbonate if a water coagulating bath is to be employed. If salts of this nature are added, we have found it desirable to dissolve them in a suitable liquid and add them to the acetylating bath just prior to precipitation, the bath being vigorously stirred during the addition of the carbonate. It is, of course, likewise possible to add the alkali carbonate in powdered form to the esterifying bath but this method of addition is less preferable.

After the esterifying or hydrolyzing bath has been thoroughly saturated or sufficiently saturated with the carbon dioxide, the resultant solution is precipitated in a warm coagulating medium. This may be effected by extruding the acetate solution through a fine nozzle into the warm coagulant or the whole mass may be poured into the coagulant which is heated to a temperature of approximately 30 to 50° C. If bicarbonate of soda is used as a carbonate carrier the carbon dioxide will break up the precipitated ester and thereby allow it to form in such a state that subsequent washing is quickly and thoroughly brought about. The precipitation can, of course, be carried out at higher or even lower temperatures with slight altering of the appearance and washing qualities of the ester, but we have found the above temperatures to be desirable.

As the time of washing of the precipitated cellulose acetate is a function of the diffusion of the contaminating substances from the precipitated ester, and particularly the diffusion of those particles of impurity which are most remote from the surface of the precipitated ester, it is readily realized that, by thus permeating the precipitated cellulose acetate with minute bubbles or tubes, the diffusion of these contaminating ingredients out of the cellulose acetate is thereby greatly facilitated.

We shall now give an example for conducting our process but it will be understood that our invention shall not be restricted by the details or proportions of ingredients therein given except as they may be indicated by the claims which are appended hereto.

To a solution containing 350 parts of hydrolyzed cellulose acetate "dope", in acetic acid, 5 to 10 parts of sodium bicarbonate may be added with thorough stirring. The bicarbonate immediately reacts with the acetic acid and the sulphuric acid present thereby saturating the whole reaction mixture with carbonic acid gas which forms a froth and when subsequently poured into warm water at 30 to 50° C. precipitates the cellulose acetate in a tubular and very porous form. This precipitated ester can be readily and economically washed and purified from the contaminating ingredients much more rapidly than a cellulose acetate precipitated in the usual manner.

Various changes may be made in the manner of introducing the carbon dioxide into the baths prior to precipitation and in the proportions of the carbonate used without in any way departing from this invention or sacrificing any of the advantages that may be derived therefrom.

What we claim as our invention and desire to be secured by Letters Patent of the United States is:

1. In the process for the manufacture of cellulose acetate the step which comprises introducing a water soluble carbonate into the hydrolyzing bath during a vigorous stirring thereof and subsequently precipitating the resulting turbulent solution into a warm coagulating medium.

2. In the process for the manufacture of cellulose acetate the step which comprises adding sodium bicarbonate to the reacting bath prior to the precipitation of the cellulose acetate therefrom into warm aqueous coagulant.

3. In the process for the manufacture of cellulose acetate the step which comprises, subsequent to hydrolysis, adding to the hydrolyzing bath containing acetic acid values, an alkali carbonate, while vigorously stirring, and precipitating the carbon dioxide charged bath into water at a temperature of approximately 50° C.

Signed at Springfield, Mass., this 3rd day of December 1929.
CHARLES S. WEBBER.
Signed at Rochester, N. Y., this 6th day of December 1929.
CYRIL J. STAUD.